P. MUELLER & A. C. SCHUERMANN.
METHOD OF COUPLING TELESCOPIC PIPES.
APPLICATION FILED OCT. 30, 1911.
1,057,763. Patented Apr. 1, 1913.
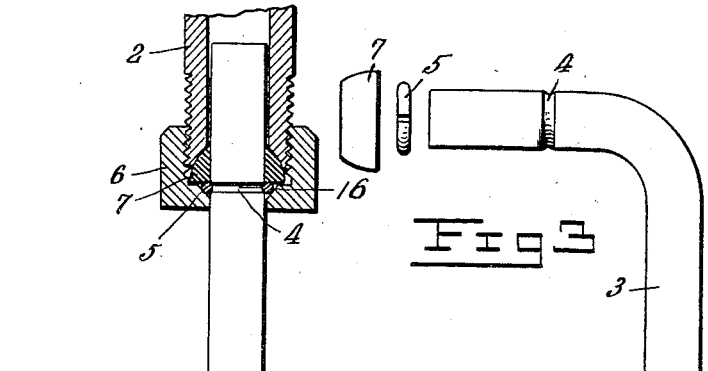
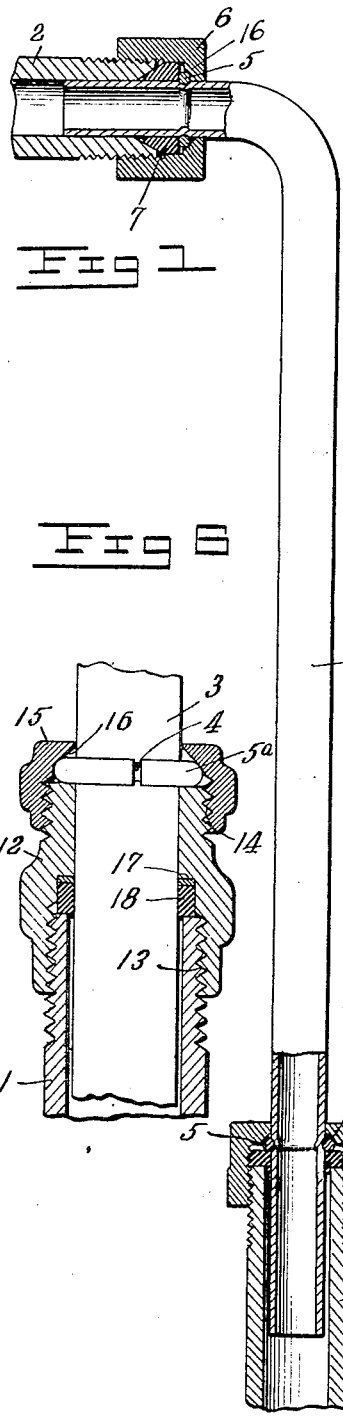
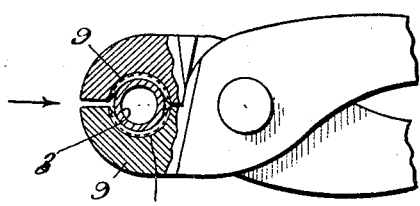
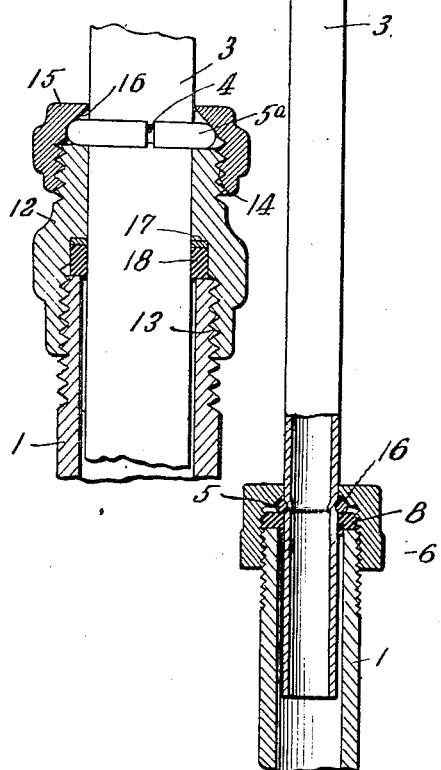
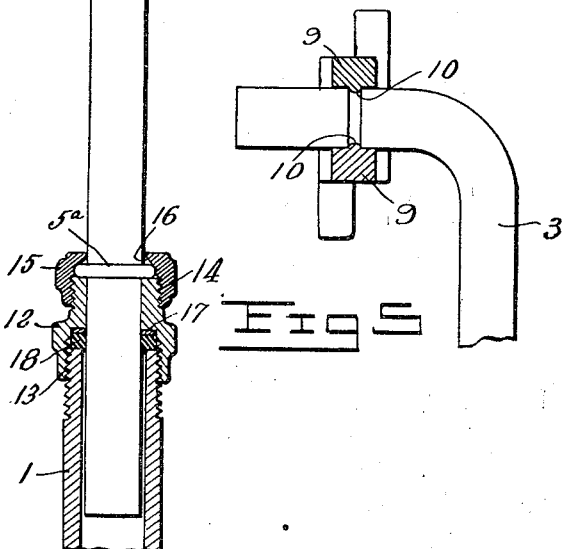
Inventors
Philip Mueller
Anton C. Schuermann
By Meyers, Cushman & Rea
Attorney
Witnesses
H. C. Robiette
A. L. Weaver

UNITED STATES PATENT OFFICE.

PHILIP MUELLER AND ANTON C. SCHUERMANN, OF DECATUR, ILLINOIS, ASSIGNORS TO H. MUELLER MFG. CO., OF DECATUR, ILLINOIS, A CORPORATION OF ILLINOIS.

METHOD OF COUPLING TELESCOPIC PIPES.

1,057,763.

Specification of Letters Patent.

Patented Apr. 1, 1913.

Application filed October 30, 1911. Serial No. 657,602.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Methods of Coupling Telescopic Pipes, of which the following is a specification.

This invention relates to a method of forming or constituting a coupling connection between telescoping pipes, designed to facilitate the formation of a non-blow-out telescopic connection under various conditions which cannot be reached by a standardized type or form of such connection.

It is quite common in the plumbing art to make telescopic connections between pipe sections, this manner of connecting the pipes being adopted because of the ease and facility with which the necessary adjustments may be made in order to meet the varying conditions found to exist in the different plumbing installations, but the telescopic connections as heretofore made, which are usually by means of a slip-joint coupling-nut, are not entirely satisfactory or reliable because of the fact that they are liable to blow out at any time to the great damage and inconvenience of the owner of the property.

It has been proposed to obviate the existing difficulty by providing one end of the telescoping pipe with a fixed ring or collar at or near one end of the pipe, the said ring or collar being a fixed part of the pipe itself, as for instance the commercial "supply" pipe, the ring or collar serving as a stop or abutment for a coupling nut, and while such a construction has been found to prevent blow-outs, at one end of the pipe, it is open to at least two most serious objections; first, the collar being a fixed part of the pipe, it is not possible to make the desired and sometimes necessary adjustments, as the collar absolutely fixes and determines the degree or extent of penetration of the telescoping pipe-member into its associated pipe member; and second, it is not commercially practicable to provide a pipe section, as, for instance a "supply" pipe, with a fixed collar at both ends, such as may be universally employed, because of the varying conditions found to exist in the different plumbing installations, such varying conditions being due to the fact that the distance between the faucet-spud or tail-piece and the service-pipe differs in the different installations. Thus, according to the present practice, the supply-pipes that have a fixed collar at one end to prevent blow-outs at such end, have no means whatever at the other end to prevent blow-outs, the connection at such end being usually made through the medium of the well known slip-joint coupling nut.

According to this invention, we entirely obviate the objections at present found to exist with the present method of making telescopic pipe connections and provide a simple and easily operable method that will enable all necessary adjustments to be made at either or both ends of the pipe, and at the same time we provide an absolutely blow-out proof connection at either or both ends of the pipe. Furthermore, according to our invention, we can use an ordinary piece of straight or bent tubing as the telescoping pipe-section, instead of being compelled to employ a specially constructed pipe-section, as for instance, the commercial supply-pipe with fixed collar, as now found upon the market.

In the accompanying drawings, which are illustrative of our improved method and one form of coupling joint made in accordance therewith, Figure 1 is a longitudinal sectional view illustrating the manner in which a supply-pipe is coupled at its opposite ends, respectively, to a faucet-spud or tail-piece and a service-pipe. Fig. 2 is a similar view showing a slightly different form of coupling nut at the service-pipe end from that illustrated in Fig. 1. Fig. 3 is an elevation of a portion of a pipe with the collar-receiving groove formed therein, the collar and a cone-packing ring being shown in position to be slipped over the end of the pipe. Fig. 4 is a plan view, partly in section of the groove-forming tool embracing a pipe as in the operation of forming the groove. Fig. 5 is a similar view of the tool and pipe looking in the direction of the arrow, Fig. 4, the tool jaws being shown in section. Fig. 6 is an enlarged sectional view of the slip-joint coupling nut shown in Fig. 2.

We wish it to be distinctly understood that our improved method may be employed or carried out in coupling together two or more telescoping pipes of any description, and while we have shown our improvements in connection with a "supply" pipe coupled at its opposite ends respectively to a faucet-spud and service-pipe, this showing is merely by way of example and is not to be considered as in any manner restrictive, it being perfectly apparent that the identical method may be carried out in coupling together any two telescoping pipes where a perfectly tight and blow-out proof connection is desired.

Referring to the drawing, numeral 1 designates a pipe member such as a service pipe, which usually projects through the floor or wall; the numeral 2 designates a faucet-spud, tail piece, or other pipe member, and the numeral 3 designates, in the instance shown, what may be termed the "supply" pipe, which is usually made of thin annealed tubing and which may be bent as shown, (Fig. 1), or straight throughout its length, as shown in Fig. 2, or of any other preferred shape, the said supply pipe having telescopic connection at its opposite ends, respectively, with the service pipe 1 and the faucet-spud or tail piece 2.

In connecting up a supply pipe with the service pipe and faucet-spur, respectively, it is necessary to make adjustments to meet the varying conditions in the different plumbing installations, these adjustments being necessary in view of the fact that the distance between the service pipe and the faucet spud varies, the variations resulting in some cases because the service pipe projects through the floor or wall to different extents in the different plumbing installations, and because the opening through the wall of the bath-tub or other lavatory receptacle through which the faucet spud or tail piece passes, is not always located at the same distance from the service pipe. It becomes necessary, therefore, in the different plumbing installations, to provide for adjustments to meet these varying conditions, and it has come to be the practice to make these adjustments by varying the extent of penetration of the supply pipe in the pipes with which it is associated, as for instance, the service pipe and the faucet spud or tail piece. This penetration of one pipe within the other not only provides for the necessary adjustments, but in many instances saves the trouble and expense of accurately measuring and cutting the length of the supply pipe.

In order to provide against blow-outs at the point or points where the supply pipe telescopes into its associated pipe member, it has been proposed to provide the supply pipe at one end with a fixed collar or ring which constitutes a shoulder for the coupling nut employed to couple the two pipes together, but, as before stated, the presence of the fixed collar on the supply pipe prevents the making of necessary adjustments, since the collar absolutely limits the extent of penetration of one pipe within another, so that while the fixed collar construction obviates blow-outs in the connection, this construction is not entirely satisfactory, because it prevents the necessary adjustments from being made.

According to our improved method, we apply the collars which constitute the shoulders for the coupling nuts at exactly the proper point on the supply pipe, the collars being applied at the place of installation of the pipes after proper measurements and adjustments have been made.

In carrying our improved method into effect we first telescope the opposite ends of the supply pipe 3, into its associated pipe members, as for instance, the service pipe 1 and the faucet spud or tail piece 2, and after making the proper adjustments we form in the supply pipe 2, an external annular groove 4, one such groove being formed at either or both ends of the supply pipe at exactly the proper point to bring about the correct position of the pipes in the finished coupling connection. In each groove we place a ring 5, preferably a split spring ring, which ring constitutes a shoulder for the coupling nut or nuts 6, a packing, such as 7, or a packing, such as 8, being slipped over the opposite ends of the supply pipe in advance of the collar to make a fluid tight connection between the coupled pipes when the nuts 6 are screwed home, or into engagement with the fixed pipes.

The annular grooves 4, may be easily and conveniently formed in the supply pipe 3, by means of a suitable tool, which, as shown in Figs. 4 and 5, comprises a pair of jaw members 9, each having a semicircular groove-forming rib 10, the said groove-forming ribs being arranged in opposition to each other, to provide a circular wall, adapted, when brought into embracing or pressing contact with the supply pipe, to tightly grip said pipe, and then by imparting a relative rotation or oscillation between the tool and the pipe section an annular groove, such as 4, will be formed therein, it being understood that during such relative rotation or oscillation between the pipe and the tool the jaws of the tool are brought together under compression, so that the rib forming grooves will bite into and depress a portion of the wall of the pipe to form the groove.

In Figs. 1 and 2 of the accompanying drawing, we have shown the supply pipe as being provided at its opposite ends with a groove and collar constructed in accordance with this invention, but we wish it distinctly understood that we may employ our method in applying a collar to such supply pipes as are now found upon the market and which have formed as a part thereof a fixed collar at one end. Thus it will be seen that we may make a blow-out proof connection at both ends of a supply pipe, while, according to present practice, it has been possible with such supply pipes, to make a blow-out proof connection at one end only, namely, at that end having the fixed collar.

In order to insure a proper and secure positioning of the ring 5, in its associated groove 4, in the pipe 3, we prefer to provide the coupling nut 6, with an annular beveled or inclined wall 6ª, at the point where contact is made between the said nut and ring. This annular beveled wall, through its contact with the ring during the act of screwing the nut 6 home, serves to force and compress the ring 5 into its groove in such a manner as to cause it to be securely seated therein.

Instead of employing the form of slip-joint coupling-nut shown associated with the service-pipe 1 in Fig. 1, we may, and in some instances, as where the supply-pipe is made substantially straight throughout its length, do prefer to employ the novel form and construction of slip-joint coupling-nut shown associated with the service-pipe as illustrated In Fig. 2. As this slip-joint coupling nut is attached to or carried by the outer pipe of the telescopic connection, it is to be considered, within the purview of our invention as a part of and included in the term "outer pipe" as we use the term in claiming this invention. This improved coupling-nut comprises a sleeve 12, internally screw-threaded at one end, as at 13, for engagement with the service-pipe and externally screw-threaded at its opposite end as at 14, to receive an internally threaded cap-nut 15. The cap-nut 15 is provided with a beveled annular wall 16, to contact with the split shoulder-ring 5ª, whereby to force said ring tightly into the annular groove in the supply-pipe. The sleeve 12, as well as the cap-nut 15, are each provided with external wrench gripping faces in order that these parts may be conveniently screwed into position, and the sleeve 12, is further provided with an internal shoulder 17, at the base of the internal threads 13, to receive suitable packing rings 18, in order that a perfectly fluid-tight joint may be made between the service and supply pipes. By this construction the fluid-tight connection is first made with the faucet shank or tail piece 2, then the adjustable slip-joint connection is made with the service-pipe 1, after which the groove is formed in the supply-pipe 3, the ring 5ª compressed therein, and the cap-nut 15 screwed home, thus making the blow-out proof connection after the supply-pipe has been properly adjusted and connected up.

By employing our method a plumber can very easily and quickly make a blow-out proof connection between any two pipes and may make whatever adjustments are required.

We do not claim herein the tool for forming the annular groove or grooves in the pipe section as this forms the subject-matter of a separate application filed Oct. 30, 1911, Serial No. 657,603.

What we claim is:

The method of coupling together two telescoping pipes wherein a coupling nut is employed, which consists in determining the desired telescoping relation between the pipes, forming a groove in the inner pipe at a place which will secure such determined telescoping relation, fitting a ring in such groove, and adjusting the coupling nut into engagement with said ring and also into engagement with the outer pipe.

In testimony whereof we have hereunto set our hands in presence of two subscribing witnesses.

PHILIP MUELLER.
ANTON C. SCHUERMANN.

Witnesses:
WILLIAM R. BIDDLE,
LEONARD F. MCKIBBEN.